Apr. 10, 1923.

C. H. LANGO

REBOUND ABSORBER

Filed Sept. 2, 1922

1,451,227

Charles H. Lango
INVENTOR

BY

ATTORNEY

Patented Apr. 10, 1923.

1,451,227

UNITED STATES PATENT OFFICE.

CHARLES H. LANGO, OF DETROIT, MICHIGAN, ASSIGNOR TO THE NOSHOK CO., OF DETROIT, MICHIGAN, A CORPORATION OF MICHIGAN.

REBOUND ABSORBER.

Application filed September 2, 1922. Serial No. 585,989.

*To all whom it may concern:*

Be it known that I, CHARLES H. LANGO, a citizen of the United States of America, residing at Detroit, Wayne County, Michigan, have invented new and useful Rebound Absorbers, of which the following is a specification.

This invention relates to resilient link devices.

This invention has utility when incorporated in connection with resilient load carrying supports as in motor vehicles for absorbing rebound.

Referring to the drawings.

Figure 1:
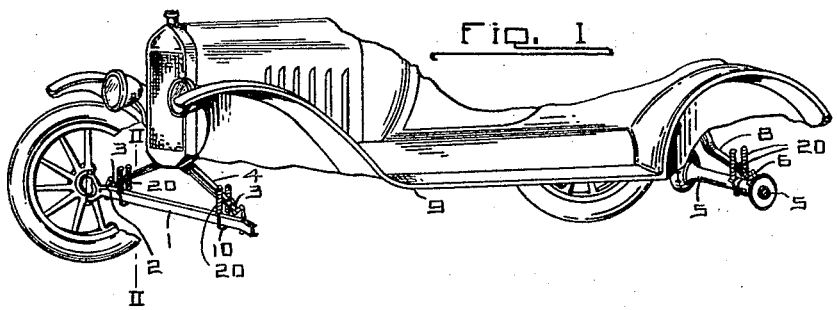
Fig. 1 is a fragmentary perspective view of a motor vehicle of the Ford type having incorporated therewith an embodiment of the invention of this disclosure.
Figure 2:
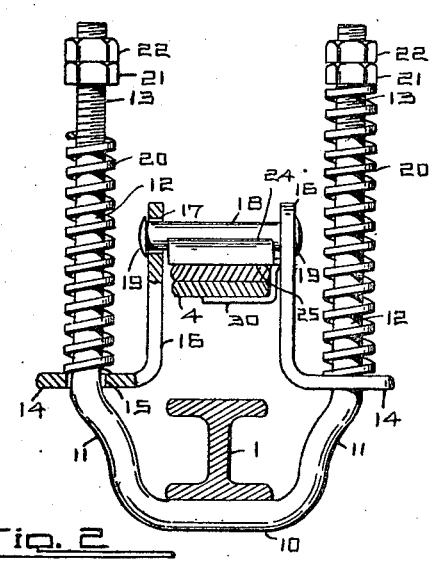
Fig. 2 is a section on the line II—II, Fig. 1, on an enlarged scale.
Figure 3:
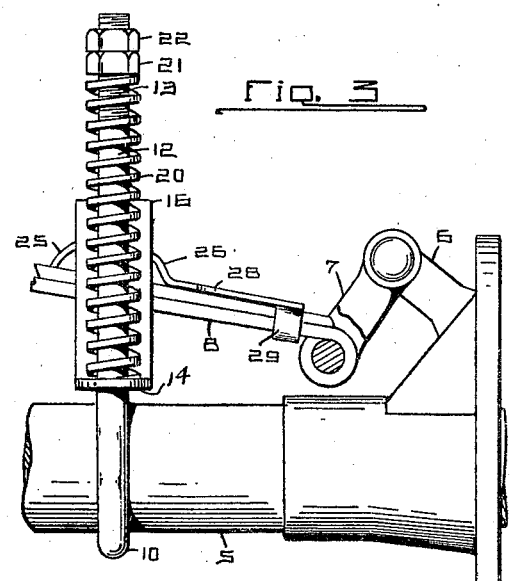
Fig. 3 is a fragmentary side elevation, of one of the devices as mounted on the rear axle.
Figure 4:
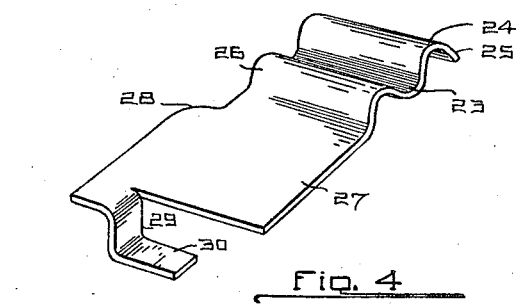
Fig. 4 is a perspective view of a saddle as a portion of the said link connection between the axle and spring.

The motor vehicle in connection with which an embodiment of the invention is shown as completely equipped may be provided with four of these rebound absorbing devices. As herein shown this motor vehicle is shown as being provided with a front axle 1 having upstanding from the end thereof, a pivot pin bracket or bearing 2 from which extends a link 3 to pivotally engage semi-elliptic spring 4. This vehicle is also shown as provided with a rear axle 5 which has an upstanding pivot pin carrying bracket 6 from which extends a link 7 for pivotal connection with rear camel-back spring 8. These springs 4 and 8 together mount the load 9 as a frame or chassis of the motor vehicle.

Without any disturbance of the motor vehicle as to assembling structure, there is mounted a device of this disclosure. This device is shown as comprising a U-bolt main frame portion. These U-bolts are shown as having main or central bend providing portions 10 from which extend outwardly and upwardly flare portions 11 to terminate in parallel upstanding leg portions 12. The free ends of these leg portions 12 have threaded portions 13.

Upon each leg 12 of the U-bolt 10, 11, 12, there is disposed a bracket member having an outwardly extending portion 14 provided with an eye 15. Each of these outward extending portions has an inwardly upwardly extending portion 16 to complete an L-bracket 14, 16. These upstanding portions 16 are each provided, near the upper end thereof, with an eye 17, through which may extend a bearing pin or rocker pin 18 having upon the outer sides of the upstanding portions 16 of the L-bracket 14, 16, head portions 19. The rocker pin 18 has bearing connections with the eyes 17 so there may be rocker movement of the pin 18 as to the portions 16 of the L-brackets 14, 16. Furthermore, the eyes 15 of these L-brackets 14, 16, are quite loosely connected or movable as to the upstanding leg portions 12 of the U-bolt. Upon each leg 12 of the U-bolt 10, 11, 12, there is disposed outwardly from the L-bracket 14, 16, a helical spring 20 which may be assembled into compressible position by nut 21 held in locked position by lock nut 22. These nuts 21, 22, may be so adjusted on the threaded portions 13 of the legs 12 as to bring the square cross-section helical compression spring 20 to slightly compressed position thereby firmly holding rocker bearing pin 18 in the bearing 23.

This bearing 23 is a part of a sheet metal saddle. This bearing 23 is shown as having on one side thereof an upstanding rib or corrugation 24 as terminating in a downwardly extending free end 25. The opposite side of this bearing 23 has a second corrugation or rib portion 26 terminating in main flat portion 27 providing the main support or bearing for this saddle, which flat portion 27 is in the plane of the free end of the downwardly bent portion 25. This main flat portion 27 of the saddle is shown as having offset portion 28 remote from the bearing 23 to have downwardly struck portion 29 carrying hook portion 30, which extends under the respective leaf springs 4 and 8 and thereby not only maintains the spaced relation for the bearing 23 as to the link 3 or 7 but also holds the saddle against upward movement as to the spring.

In practice, it is found acceptable, to design the device somewhat larger for the rear axle than for the forward axle. In an automobile equipped with the devices of this disclosure there is not only assistance given to the steering in that there is reduced vibration of the front axle as to the vehicle, but the car is at all times maintained with its wheels on the road regardless of the roughness of the roads or the speed of the car. This is a further assistance in the control of the car at all times not only in straightaway driving but very valuable in turning. Absolute avoidance of recoil is obtained to the comfort of the passengers in the car. This means there is a smoothness and steadiness of riding of the car which means there is a great reduction in the wear on the car as well as on the tires. There is avoidance of any side sway in the travel of the vehicle even of the Ford type.

What is claimed and it is desired to secure by Letters Patent is:—

1. The combination with a load carrying axle, a load to be carried, a spring therebetween, of a U-bolt having its U-portion rockably engage the axle, the legs of the U-bolt upstanding from said axle, a pair of L-brackets having eyes therethrough, said L-brackets oppositely disposed between the legs of the U-bolt with a leg of the U-bolt through an eye of each thereof, a rocker pin through the upstanding opposing L-bracket portions, said pin to ride upon the opposite side of the spring from the axle, and a spring for each leg of the U-bolt for resiliently maintaining axle position as to the leaf spring.

2. The combination with a load carrying axle, a load to be carried, a spring therebetween, of a U-bolt having its U-portion rockably engage the axle, the legs of the U-bolt upstanding from said axle, a pair of L-brackets having eyes therethrough, said L-brackets oppositely disposed between the legs of the U-bolt with a leg of the U-bolt through an eye of each thereof, a rocker pin through the upstanding opposing L-bracket portions, said pin to ride upon the opposite side of the spring from the axle, a rectangular cross-section helical spring about each leg of the U-bolt and against an L-bracket portion, and adjustable lock nuts for adjusting said helical springs.

3. The combination with a load carrying axle, a load to be carried, a spring therebetween, of a U-bolt having its U-portion rockably engage the axle, the legs of the U-bolt upstanding from said axle, a pair of L-brackets having eyes therethrough, said L-brackets oppositely disposed between the legs of the U-bolt with a leg of the U-bolt through an eye of each thereof, a rocker pin through the upstanding opposing L-bracket portions, a saddle on the leaf spring providing a bearing for the pin, and a helical spring for each leg of the U-bolt for resiliently maintaining the axle position as to the spring.

4. The combination with a load carrying axle, a load to be carried, a spring therebetween, of a U-bolt having its U-portion rockably engage the axle, the legs of the U-bolt upstanding from said axle, a pair of L-brackets having eyes therethrough, said L-brackets oppositely disposed between the legs of the U-bolt with a leg of the U-bolt through an eye of each thereof, a rocker pin through the upstanding opposing L-bracket portions, a uniform thickness saddle on the leaf spring providing a bearing for the pin, and a helical spring for each leg of the U-bolt for resiliently maintaining the axle position as to the spring.

5. A rebound absorber spring engaging saddle embodying a flat main supporting portion, a corrugated end portion extending in one direction therefrom to provide a bearing, and in the opposite direction therefrom having a drop portion to provide a hook for maintaining the flat portion in position, said flat portion being of uniform thickness with the hook portion and the corrugated portion.

In witness whereof I affix my signature.

CHARLES H. LANGO.